United States Patent
Chi et al.

(10) Patent No.: US 9,264,135 B2
(45) Date of Patent: Feb. 16, 2016

(54) BIDIRECTIONAL PENTAPLEX SYSTEM AND METHOD

(71) Applicant: National Taiwan University of Science and Technology, Taipei (TW)

(72) Inventors: Chang-Chia Chi, Taipei (TW); Chen-Wen Tarn, Taipei (TW); I-Ju Chen, Taipei (TW)

(73) Assignee: NATIONAL TAIWAN UNIVERSITY OF SCIENCE AND TECHNOLOGY, Taipei (TW)

( * ) Notice: Subject to any disclaimer, the term of this patent is extended or adjusted under 35 U.S.C. 154(b) by 59 days.

(21) Appl. No.: 14/326,003

(22) Filed: Jul. 8, 2014

(65) Prior Publication Data

US 2015/0229390 A1  Aug. 13, 2015

(30) Foreign Application Priority Data

Feb. 11, 2014 (TW) ............................ 103104492 A

(51) Int. Cl.
H04B 10/00 (2013.01)
H04B 10/079 (2013.01)
H04Q 11/00 (2006.01)
H04B 10/2575 (2013.01)

(52) U.S. Cl.
CPC ...... *H04B 10/07957* (2013.01); *H04B 10/0795* (2013.01); *H04B 10/25753* (2013.01); *H04Q 11/0067* (2013.01); *H04Q 2011/0016* (2013.01); *H04Q 2011/0083* (2013.01)

(58) Field of Classification Search
USPC .................................................. 398/135–139
See application file for complete search history.

(56) References Cited

U.S. PATENT DOCUMENTS

| | | | | |
|---|---|---|---|---|
| 5,528,407 A * | 6/1996 | Nakata | ............... | H04B 10/40 398/136 |
| 5,898,167 A * | 4/1999 | Musha | ............... | G02B 5/3083 250/201.5 |
| 6,442,182 B1 * | 8/2002 | Govorkov | ............... | B23K 26/12 372/102 |
| 6,493,121 B1 * | 12/2002 | Althaus | ............... | G02B 6/4246 398/135 |
| 6,983,005 B2 * | 1/2006 | Masui | ............... | G02B 5/32 369/112.04 |
| 7,654,750 B2 * | 2/2010 | Brenner | ............... | G02B 6/4246 385/89 |
| 8,235,605 B2 * | 8/2012 | Kim | ............... | G02B 6/4246 359/629 |
| 8,380,073 B2 * | 2/2013 | Edwards | ............... | G02B 6/4201 398/135 |
| 8,705,975 B2 * | 4/2014 | Chen | ............... | G02B 6/4246 398/138 |
| 8,750,712 B2 * | 6/2014 | Ruiz | ............... | G02B 6/122 398/135 |
| 2003/0147601 A1 * | 8/2003 | Bartur | ............... | G02B 6/4214 385/92 |
| 2004/0179784 A1 * | 9/2004 | Vancoille | ............... | G02B 6/4246 385/47 |
| 2006/0198404 A1 * | 9/2006 | Henrichs | ............... | H01S 5/18391 372/29.02 |
| 2008/0247766 A1 * | 10/2008 | McCaul | ............... | H04B 10/693 398/202 |
| 2010/0226655 A1 * | 9/2010 | Kim | ............... | G02B 6/4246 398/139 |
| 2012/0002284 A1 * | 1/2012 | McColloch | ............... | G02B 6/4206 359/558 |
| 2015/0229390 A1 * | 8/2015 | Chi | ............... | H04B 10/07957 398/34 |

\* cited by examiner

*Primary Examiner* — Agustin Bello
(74) *Attorney, Agent, or Firm* — Bacon & Thomas, PLLC

(57) ABSTRACT

A bidirectional pentaplex system is connected to a machine room. The machine room provides a first optical signal, a second optical signal and a monitoring signal and transmits to the bidirectional pentaplex system. The bidirectional pentaplexer includes a first receiving unit, a second receiving unit, a first emitting unit, a second emitting unit, a filter, a transceiver, a grating, a plurality of reflecting units and a control circuit. The receiving units and the transceiver respectively receives the signals, then the control circuit controls the emitting units emitting the feedback signals and transmits the feedback signals back to the machine room.

9 Claims, 4 Drawing Sheets

BIDIRECTIONAL PENTAPLEX SYSTEM AND METHOD

BACKGROUND OF THE INVENTION (1) Field of the Invention

The invention relates to a bidirectional pentaplex system, and especially relates to a bidirectional pentaplex system and method thereof.

(2) Description of the Prior Art

With the enhancing penetration of global broadband Internet, the currently triple play service containing voice, data and multimedia service replaces the data service as the core in the past. In the provisioning of broadband networks, in addition to the carriers that active in the construction, the Multiple System Operator (MSO) also offers a video, Voice over Internet Protocol (VoIP) and broadband Internet services to users through the Hybrid Fiber Coaxial (HFC). The appearance of Radio Frequency over Glass (RFoG) allows MSO can use the backstage equipment of traditional HFC continually, and then transmits cable television signals and broadband Internet service to the optical network unit through the fiber that can provide triple play service. It can improve the disadvantages of HFC, and reduce equipment replacement costs.

At the moment, many manufacturers combines Bi-directional Optical Sub-Assembly (BOSA) with Triplexer to apply for RFoG and Gigabit Passive Optical Network (GPON) or Gigabit Ethernet Passive Optical Network (GEPON). However, its main function is to design the operational wavelength in single Internet which applied for RFoG or GPON/GEPON. For the RFoG and GPON/GEPON integrated in the same passive optical network architecture, it doesn't have any integrated device that can transmit and receive different wavelengths by wavelength division multiplexing.

SUMMARY OF THE INVENTION

Accordingly, the object of the invention is to provide a bidirectional pentaplex system that can transmit Radio Frequency over Glass (RFoG) with Gigabit Passive Optical Network (GPON) or Gigabit Ethernet Passive Optical Network (GEPON) simultaneously on a single optical fiber, which can perform wavelength division multiplexing, transmission and reception.

Another object of the invention is to provide a bidirectional pentaplex system that can reduce the use of filters by using the grating and mirror.

The other object of the invention is to provide a bidirectional pentaplex method that can integrate with the monitoring signal in the passive optical network, which can provide the function of real-time network monitoring.

In one aspect, the invention provides a bidirectional pentaplex system of the invention is connected to a machine room. The machine room provides a first optical signal, a second optical signal and a monitoring signal and transmits to the bidirectional pentaplex system. The bidirectional pentaplexer includes a first receiving unit, a second receiving unit, a first emitting unit, a second emitting unit, a transceiver, a filter, a grating, a plurality of reflecting units and a control circuit. The filter receives the first optical signal, the second optical signal and the monitoring signal. The monitoring signal penetrates the filter and transmits to the transceiver. The filter reflects the first optical signal and the second optical signal to the grating. The transceiver receives the monitoring signal from the filter. The grating receives the first optical signal and the second optical signal reflected by the filter, splitting the first optical signal and the second optical signal.

The first reflecting unit receives the first optical signal spilt by the grating and then reflects the first optical signal. The second reflecting unit receives the second optical signal split by the grating and then reflects the second optical signal. The first receiving unit receives the first optical signal reflected by the first reflecting unit. The second receiving unit receives the second optical signal reflected by the second reflecting unit. The control circuit is electrically connected to the first receiving unit, the second receiving and the transceiver. The transceiver receives the monitoring unit, and the control circuit controls the transceiver emitting a third feedback signal. The third feedback signal penetrates the filter and transmits back to the machine room. The first emitting unit is electrically connected to the control unit. The control circuit controls the first emitting unit emitting a first feedback signal. The second emitting unit is electrically connected to the control unit. The control circuit controls the second emitting unit emitting a second feedback signal. The third reflecting unit receives the first feedback signal emitted by the first emitting unit, and reflects the first feedback signal back to the machine room. The fourth reflecting unit receives the second feedback signal emitted by the second emitting unit, and reflects the second feedback signal back to the machine room.

In an embodiment, the bidirectional pentaplex system further includes a splitter and a lens, wherein the connection between the machine room, the splitter and the lens is based on a fiber, the splitter receiving the first optical signal, the second optical signal and the monitoring signal provided by the machine room and transmitting to the lens, the lens transmitting the first optical signal, the second optical signal and the monitoring signal to the filter.

In another embodiment, each of receiving unit is a photodetector, each of emitting unit and the transceiver are respectively a laser diode, and each of reflecting unit is a mirror.

A bidirectional pentaplex method includes the following steps: proving the bidirectional pentaplex system; the machine room transmitting the first optical signal, the second optical signal and the monitoring signal to the filter, wherein the wavelength of the first optical signal, the wavelength of the second optical signal and the wavelength of the monitoring signal are different; the filter receiving the first optical signal, the second optical signal and the monitoring signal, the filter reflecting the first optical signal and the second optical signal to the grating, and the monitoring signal penetrating the filter and transmitting to the transceiver; the grating splitting the first optical signal and the second optical signal, wherein the first optical signal is transmitted to a first reflecting unit, and the second optical signal is transmitted to a second reflecting unit; the first reflecting unit reflecting the first optical signal and transmitting to the first receiving unit; the second reflecting unit reflecting the second optical signal and transmitting to the second receiving unit; the control circuit controlling the first emitting unit emit the first feedback signal to the third reflecting unit, and controlling the second emitting unit emit the second feedback signal to the fourth reflecting unit, wherein the wavelength of the first optical signal is not equal to the wavelength of the first feedback signal, and the wavelength of the second optical signal is not equal to the wavelength of the second feedback signal; the third reflecting unit reflecting the first feedback signal to the machine room, the fourth reflecting unit reflecting the second feedback signal to the machine room; and the control circuit controlling the transceiver emit a third feedback signal penetrating the filter and transmitting back to the machine room, wherein the wavelength of the monitoring signal is equal to the wavelength of the third feedback signal.

In another embodiment, the bidirectional pentaplex method includes: providing a splitter and a lens, wherein the connection between the machine room, the splitter and the lens is based on a fiber; the splitter receiving the first optical signal, the second optical signal and the monitoring signal provided by the machine room and transmitting to the lens, the lens transmitting the first optical signal, the second optical signal and the monitoring signal to the filter.

In another embodiment, the bidirectional pentaplex method includes: the first feedback signal reflected by the third reflecting unit, the second feedback signal reflected by the fourth reflecting unit and the third feedback signal reflected by the transceiver coupling to the fiber trough the lens and transmitting back to the machine room.

In another embodiment, the bidirectional pentaplex method includes: the first feedback signal reflected by the third reflecting unit, the second feedback signal reflected by the fourth reflecting unit and the third feedback signal reflected by the transceiver coupling to the fiber trough the lens and transmitting back to the machine room.

In another embodiment, the first optical signal and the first feedback signal are Gigabit Passive Optical Network signals.

In another embodiment, the first optical signal and the first feedback signal are Gigabit Ethernet Passive Optical Network signals.

In another embodiment, the second optical signal and the second feedback signal are Radio Frequency over Glass signals.

DESCRIPTION OF THE PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
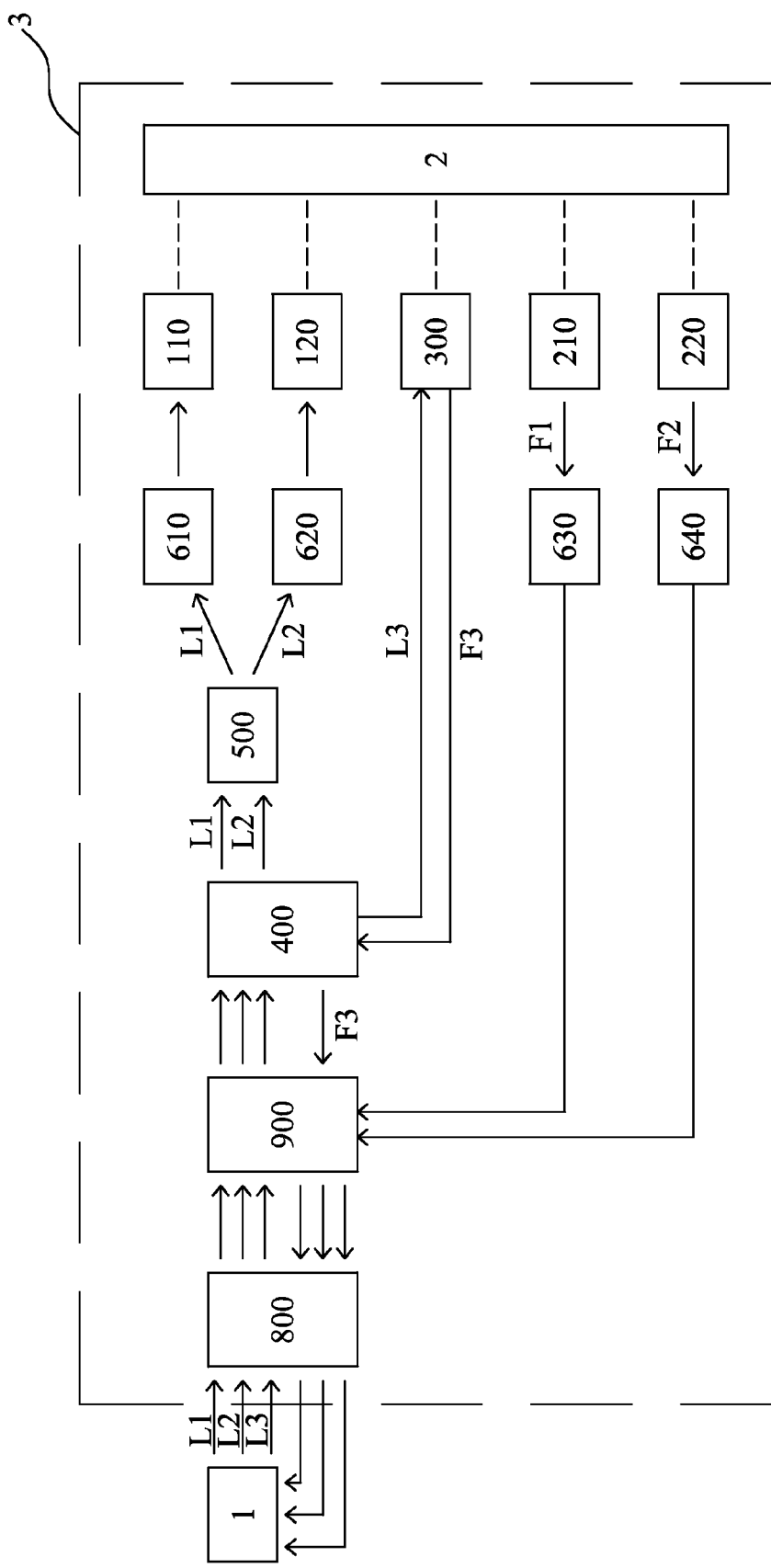
FIG. 1 and FIG. 2 are the schematic diagram of a bidirectional pentaplex system.
Figure 2:
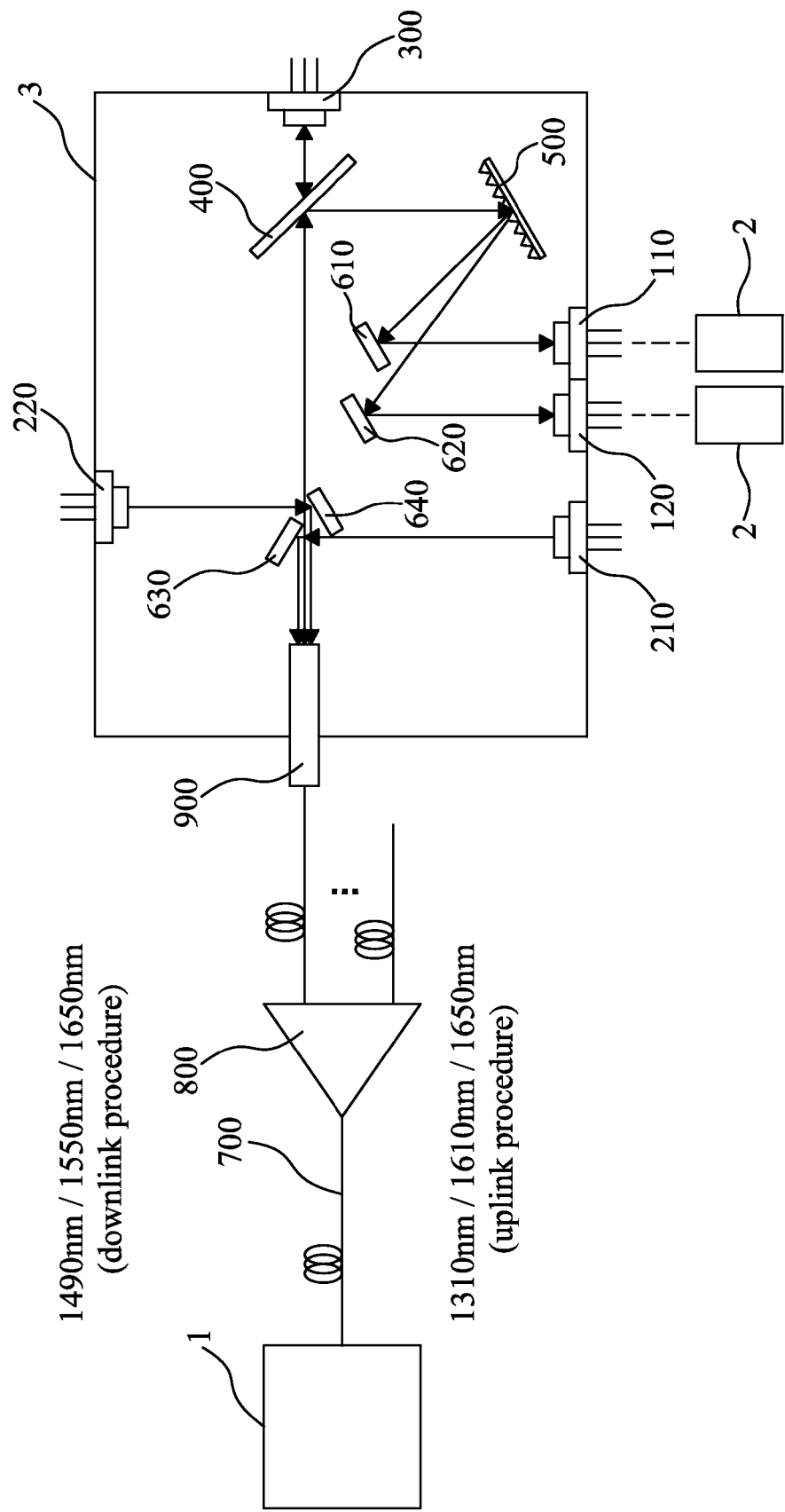

Refer to FIG. 1 and FIG. 2, they are the schematic diagrams of a bidirectional pentaplex system. A bidirectional pentaplex system 3 of the invention is connected to a machine room 1. The machine room 1 provides a first optical signal L1, a second optical signal L2 and a monitoring signal L3 and transmits to the bidirectional pentaplex system 3. The bidirectional pentaplexer includes a first receiving unit 110, a second receiving unit 120, a first emitting unit 210, a second emitting unit 220, a transceiver 300, a filter 400, a grating 500, a plurality of reflecting units 610, 620, 630, 640 and a control circuit 2. The filter 400 receives the first optical signal L1, the second optical signal L2 and the monitoring signal L3. The monitoring signal L3 penetrates the filter 400 and transmits to the transceiver 300. The filter 400 reflects the first optical signal L1 and the second optical signal L2 to the grating 500. The transceiver 300 receives the monitoring signal from the filter 400. The grating 500 receives the first optical signal L1 and the second optical signal L2 reflected by the filter 400, splitting the first optical signal L1 and the second optical signal L2. The first reflecting unit 610 receives the first optical signal L1 spilt by the grating 500 and then reflects the first optical signal L1. The second reflecting unit 620 receives the second optical signal L2 split by the grating 500 and then reflects the second optical signal L2. The first receiving unit 110 receives the first optical signal L1 reflected by the first reflecting unit 610. The second receiving unit 120 receives the second optical signal L2 reflected by the second reflecting unit 620. The control circuit 2 is electrically connected to the first receiving unit 110, the second receiving 120 and the transceiver 300. The transceiver 300 receives the monitoring unit L3, and the control circuit 2 controls the transceiver 300 emitting a third feedback signal F3. The third feedback signal F3 penetrates the filter 400 and transmits back to the machine room 1. The first emitting unit 210 is electrically connected to the control unit 2. The control circuit 2 controls the first emitting unit 210 emitting a first feedback signal F1. The second emitting unit 220 is electrically connected to the control unit 2. The control circuit 2 controls the second emitting unit 220 emitting a second feedback signal F2. The third reflecting unit 630 receives the first feedback signal F1 emitted by the first emitting unit 210, and reflects the first feedback signal F1 back to the machine room 1. The fourth reflecting unit 640 receives the second feedback signal F2 emitted by the second emitting unit 220, and reflects the second feedback signal F2 back to the machine room 1.

In the embodiment, the first receiving unit 110 and the second receiving unit 120 are respectively a photo detector. The first emitting unit 210, the second emitting unit 220, and the transceiver 300 are respectively a laser diode. The reflecting units 610, 620, 630, 640 are respectively a mirror.

The bidirectional pentaplex system further includes a splitter 800 and a lens 900. The connection between the machine room 1, the splitter 800 and the lens 900 is based on a fiber 700. The splitter 800 receives the first optical signal L1, the second optical signal L2 and the monitoring signal L3 provided by the machine room 1 and transmitting to the lens 900. The lens transmits the first optical signal L1, the second optical signal L2 and the monitoring signal L3 to the filter 400.

Figure 3:
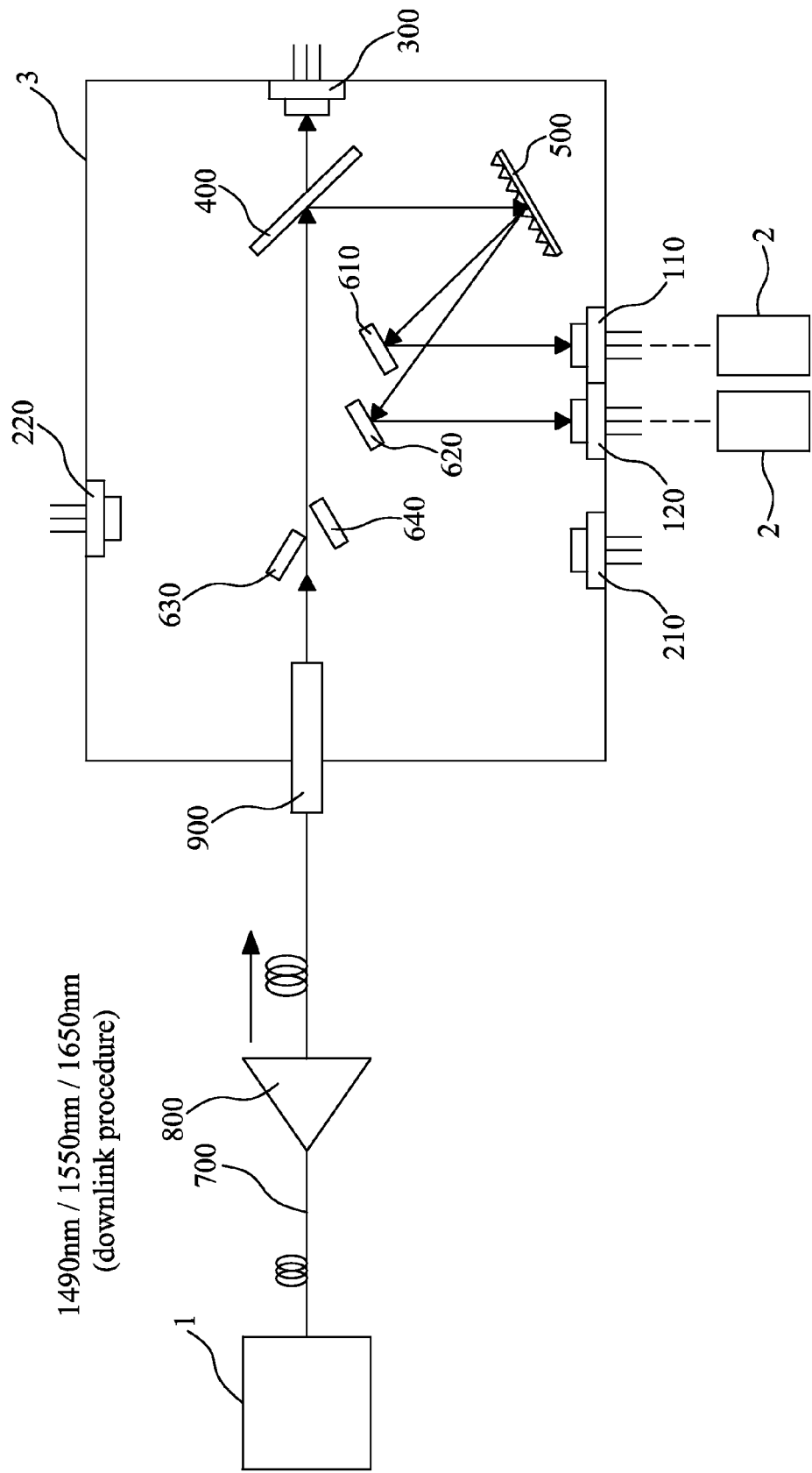
FIG. 3 is the schematic diagram of downlink procedure of the bidirectional pentaplex method.
Figure 4:
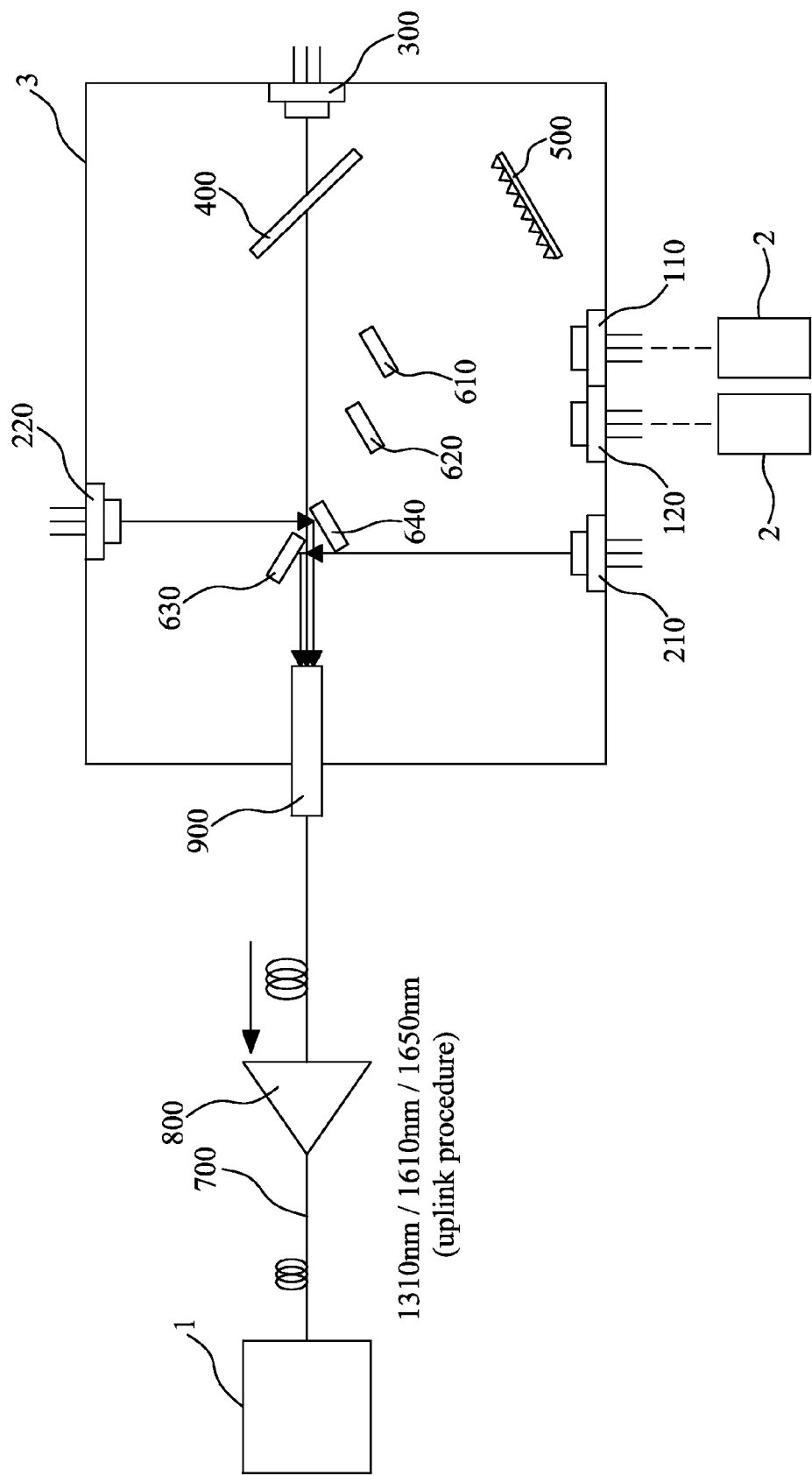
FIG. 4 is the schematic diagram of uplink procedure of the bidirectional pentaplex method.

A bidirectional pentaplex method is applied to the bidirectional pentaplex system 3, and includes a uplink procedure and a downlink procedure, please refer to FIGS. 2, 3 and 4. Refer to FIG. 3, it is the schematic diagram of the downlink procedure. The downlink procedure of the bidirectional pentaplex method includes the following steps:

Step 110: Proving the bidirectional pentaplex system 3 as FIG. 1. The machine room 1 transmits the first optical signal L1, the second optical signal L2 and the monitoring signal L3 to the filter 400, wherein the wavelength of the first optical signal L1, the wavelength of the second optical signal L2 and the wavelength of the monitoring signal L3 are different.

Step 120: The filter 400 receives the first optical signal L1, the second optical signal L2 and the monitoring signal L3. The filter 400 reflects the first optical signal L1 and the second optical signal L2 to the grating 500, and the monitoring signal L3 penetrates the filter 400 and transmits to the transceiver 300.

Step 130: The grating 500 splits the first optical signal L1 and the second optical signal L2, wherein the first optical signal L1 is transmitted to a first reflecting unit 610, and the second optical signal L2 is transmitted to a second reflecting unit 620.

Step 140: The first reflecting unit 610 reflects the first optical signal L1 and transmits to the first receiving unit 110.

Step 150: The second reflecting unit 620 reflects the second optical signal L2 and transmits to the second receiving unit 120.

Refer to FIG. 4, it is the schematic diagram of the uplink procedure. The uplink procedure of the bidirectional pentaplex method includes the following steps:

Step 210: The control circuit 2 controls the first emitting unit 210 emit the first feedback F1 signal to the third reflecting unit 630, and controls the second emitting unit 220 emit the second feedback signal F2 to the fourth reflecting unit 640, wherein the wavelength of the first optical signal L1 is not equal to the wavelength of the first feedback signal F1, and the wavelength of the second optical signal L2 is not equal to the wavelength of the second feedback signal F2.

Step 220: The third reflecting unit 630 reflects the first feedback signal F1 to the machine room 1, the fourth reflecting unit 640 reflects the second feedback signal F2 to the machine room 1.

Step 230: The control circuit 2 controls the transceiver 300 emit a third feedback signal F3 penetrating the filter 400 and transmitting back to the machine room 1, wherein the wavelength of the monitoring signal L3 is equal to the wavelength of the third feedback signal F3.

The downlink procedure of the bidirectional pentaplex method further includes the following steps:

Step 160: The splitter 800 receives the first optical signal L1, the second optical signal L2 and the monitoring signal L3 and transmits to the lens 900.

Step 170: The lens 900 transmits the first optical signal L1, the second optical signal L2 and the monitoring signal L3 to the filter 400.

The uplink procedure of the bidirectional pentaplex method further includes the following steps:

Step 240: The first feedback signal F1, the second feedback signal F2 and the third feedback signal F3 couples to the fiber 700 trough the lens 900 and transmits back to the machine room 1.

In an embodiment, the first optical signal L1 and the first feedback signal F1 are Gigabit Passive Optical Network (GPON) signals or Gigabit Ethernet Passive Optical Network (GEPON) signals. Gigabit Passive Optical Network (GPON) and Gigabit Ethernet Passive Optical Network (GEPON) operate in same wavelength range. In the downlink procedure, the wavelength of the first optical signal L1 is 1490 nm, while in the uplink procedure, the wavelength of the first feedback signal F1 is 1310 nm. The second optical signal and the second feedback signal are Radio Frequency over Glass (RFoG) signal. In the downlink procedure, the wavelength of the second optical signal L2 is 1550 nm, while in the uplink procedure, the wavelength of the second feedback signal F2 is 1610 nm. Besides, the monitoring signal L3 can provide the network failure points of real time monitoring, and the wavelength of the monitoring signal L3 and the third feedback signal F3 are also 1650 nm.

The multiple-system operator (MSO) combines Passive Optical Network (PON) with Radio Frequency over Glass (RFoG) to connect fiber to the optical network unit (ONU) directly. The main benefit is to expand broadband services by the existing operation system. The present invention provides a bidirectional pentaplex system, enabling the multiple-system operator (MSO) can combine Gigabit Passive Optical Network or Gigabit Ethernet Passive Optical Network with Radio Frequency over Glass under the same architecture of passive optical network, and provides triple play diversified services. The present invention provides a bidirectional pentaplex system that can make wavelengths divided multiplexing, and combines with bidirectional pentaplex methods, when used in the triple play architecture; it has the advantage of lower cost and the reduction of network failure points and so on.

The differences between the bidirectional pentaplex system of the present invention, the conventional bidirectional optical sub-assembly (BOSA) and triplexer are described as following:

1. It can transmit Radio Frequency over Glass (RFoG) with Gigabit Passive Optical Network (GPON) or Gigabit Ethernet Passive Optical Network (GEPON) simultaneously on a single optical fiber, which can perform wavelength division multiplexing, transmission and reception.

2. The bidirectional pentaplex system can reduce the use of filters by using the grating and mirror, and prevent excessively attenuating when the optical signal pass through the filters in order to reduce costs.

3. The bidirectional pentaplex method integrate with the monitoring signal in the passive optical network, which can provide the function of real-time network monitoring.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A bidirectional pentaplex system connected to a machine room, the machine room providing a first optical signal, a second optical signal and a monitoring signal and transmitting to the bidirectional pentaplex system, the bidirectional pentaplex system comprising:
    a filter, for receiving the first optical signal, the second optical signal and the monitoring signal, wherein the filter is penetrated by the monitoring signal, and reflects the first optical signal and the second optical signal;
    a transceiver, for receiving the monitoring signal from the filter;
    a grating, for receiving the first optical signal and the second optical signal reflected by the filter, splitting the first optical signal and the second optical signal;
    a first reflecting unit, for receiving the first optical signal spilt by the grating and then reflecting the first optical signal;
    a second reflecting unit, for receiving the second optical signal split by the grating and then reflecting the second optical signal;
    a first receiving unit, for receiving the first optical signal reflected by the first reflecting unit;
    a second receiving unit, for receiving the second optical signal reflected by the second reflecting unit;
    a control circuit, electrically connected to the first receiving unit, the second receiving and the transceiver, wherein the transceiver receives the monitoring unit, the control circuit controls the transceiver emitting a third feedback signal, and the feedback signal penetrates the filter and transmits back to the machine room;
    a first emitting unit, electrically connected to the control unit, wherein the control circuit controls the first emitting unit emitting a first feedback signal;
    a second emitting unit, electrically connected to the control unit, wherein the control circuit controls the second emitting unit emitting a second feedback signal;
    a third reflecting unit, for receiving the first feedback signal emitted by the first emitting unit, and reflecting the first feedback signal back to the machine room; and
    a fourth reflecting unit, for receiving the second feedback signal emitted by the second emitting unit, and reflecting the second feedback signal back to the machine room.

2. The bidirectional pentaplex system of claim 1, further comprising a splitter and a lens, wherein the connection between the machine room, the splitter and the lens is based on a fiber, the splitter receiving the first optical signal, the second optical signal and the monitoring signal provided by the machine room and transmitting to the lens, the lens transmitting the first optical signal, the second optical signal and the monitoring signal to the filter.

3. The bidirectional pentaplex system of claim 2, wherein each of receiving unit is a photodetector, each of emitting unit and the transceiver are respectively a laser diode, and each of reflecting unit is a mirror.

4. A bidirectional pentaplex method, comprising the following steps:
    proving the bidirectional pentaplex system as claim 1;
    the machine room transmitting the first optical signal, the second optical signal and the monitoring signal to the filter, wherein the wavelength of the first optical signal, the wavelength of the second optical signal and the wavelength of the monitoring signal are different;
    the filter receiving the first optical signal, the second optical signal and the monitoring signal, the filter reflecting the first optical signal and the second optical signal to the grating, and the monitoring signal penetrating the filter and transmitting to the transceiver;
    the grating splitting the first optical signal and the second optical signal, wherein the first optical signal is transmitted to a first reflecting unit, and the second optical signal is transmitted to a second reflecting unit;
    the first reflecting unit reflecting the first optical signal and transmitting to the first receiving unit;
    the second reflecting unit reflecting the second optical signal and transmitting to the second receiving unit;
    the control circuit controlling the first emitting unit emit the first feedback signal to the third reflecting unit, and controlling the second emitting unit emit the second feedback signal to the fourth reflecting unit, wherein the wavelength of the first optical signal is not equal to the wavelength of the first feedback signal, and the wavelength of the second optical signal is not equal to the wavelength of the second feedback signal;
    the third reflecting unit reflecting the first feedback signal to the machine room, the fourth reflecting unit reflecting the second feedback signal to the machine room; and
    the control circuit controlling the transceiver emit a third feedback signal penetrating the filter and transmitting back to the machine room, wherein the wavelength of the monitoring signal is equal to the wavelength of the third feedback signal.

5. The bidirectional pentaplex method of claim 4, comprising:
    providing a splitter and a lens, wherein the connection between the machine room, the splitter and the lens is based on a fiber;
    the splitter receiving the first optical signal, the second optical signal and the monitoring signal provided by the machine room and transmitting to the lens, the lens transmitting the first optical signal, the second optical signal and the monitoring signal to the filter.

6. The bidirectional pentaplex method of claim 5, comprising:
    the first feedback signal reflected by the third reflecting unit, the second feedback signal reflected by the fourth reflecting unit and the third feedback signal reflected by the transceiver coupling to the fiber trough the lens and transmitting back to the machine room.

7. The bidirectional pentaplex method of claim 4, wherein the first optical signal and the first feedback signal are Gigabit Passive Optical Network signals.

8. The bidirectional pentaplex method of claim 4, wherein the first optical signal and the first feedback signal are Gigabit Ethernet Passive Optical Network signals.

9. The bidirectional pentaplex method of claim 4, wherein the second optical signal and the second feedback signal are Radio Frequency over Glass signals.

\* \* \* \* \*